United States Patent [19]

Martinson

[11] 4,411,009
[45] Oct. 18, 1983

[54] DIGITAL DUAL HALF WORD OR SINGLE WORD POSITION SCALER

[75] Inventor: Lloyd W. Martinson, Haddonfield, N.J.

[73] Assignee: RCA Corporation, New York, N.Y.

[21] Appl. No.: 213,393

[22] Filed: Dec. 5, 1980

[51] Int. Cl.³ .......................... G06F 7/38; G06G 7/00
[52] U.S. Cl. ..................................................... 377/47
[58] Field of Search ..................... 235/92 DM, 92 CC; 364/761, 764; 377/27, 33, 44, 47, 48, 51; 5/451

[56] References Cited

U.S. PATENT DOCUMENTS 3,824,385  7/1974  Kiencke ........................ 235/92 DM Primary Examiner—Joseph A. Orsino, Jr.
Attorney, Agent, or Firm—J. S. Tripoli; D. W. Phillion

[57] ABSTRACT

An expandable scaler for scaling an N bit digital word. The system comprises first and second scalers each of which comprises N input terminals for receiving an N bit word, N output terminals, and $(x+1)$ corresponding groups of first switching logic to form $(x+1)$ corresponding pairs of groups of first switching logic with each group having input terminals and output terminals and being arranged in successive manner with the output of each of the first (x) groups being connected in parallel manner to the input terminals of the next successive group and where $2^x = N$, and leads for supplying the N bit digital input word to the input terminals of the group of first switching logic and further with each pair of corresponding groups of switching logic means responsive to an enabling signal to selectively shift the N bit digital input word by one of $2^0, 2^1, -2^x = m$ bit positions. Also provided are $(x+1)$ groups of second switching logic which are individually responsive, when enabled, to corresponding ones of the $(x+1)$ groups of first switching logic, when enabled, of said first and second scalers to connect the R least significant bits of the N bit digital input word supplied to the group of first switching logic of the first scaler to the R most significant bit positions of the corresponding group of first switching logic of the second scaler. The system is expandable in word length by added pairs of scalers corresponding to the first and second scalers and substantially in parallel therewith and expandable in bit shifting capability by adding similar scalers to the outputs of scaler pairs.

5 Claims, 6 Drawing Figures

SCALAR TRUTH TABLE

|   |   | A | B | C | D | E |
|---|---|---|---|---|---|---|
| I |   |   | PERMUTATIONS OF CONTROL WORDS SUPPLIED TO SWITCH CONTROL LEADS $S_1$-$S_4$ AND $S_5$-$S_8$ | | VARIOUS CONNECTIONS OF INPUT TERMINALS $a_0$-$a_3$ AND $c_0$-$c_5$ TO OUTPUT TERMINALS $b_0$-$b_7$ AND $d_1$-$d_7$ WITH DIFFERENT CONTROL WORDS | |
| II |   | EXT | $S_1 S_2 S_3 S_4$ | $S_5 S_6 S_7 S_8$ | $b_0\ b_1\ b_2\ b_3\ b_4\ b_5\ b_6\ b_7$ (OUTPUT TERMINALS) | $d_0\ d_1\ d_2\ d_3\ d_4\ d_5\ d_6\ d_7$ (OUTPUT TERMINALS) |
| III | a | 0 | 0 0 0 0 | 0 0 0 0 | $a_0\ a_1\ a_2\ a_3\ a_4\ a_5\ a_6\ a_7$ | $c_0\ c_1\ c_2\ c_3\ c_4\ c_5\ c_6\ c_7$ |
| III | b | 0 | 1 0 0 0 | 1 0 0 0 | $a_1\ a_2\ a_3\ a_4\ a_5\ a_6\ a_7\ a_S$ | $c_1\ c_2\ c_3\ c_4\ c_5\ c_6\ c_7\ c_S$ |
| III | c | 0 | 0 1 0 0 | 0 1 0 0 | $a_2\ a_3\ a_4\ a_5\ a_6\ a_7\ a_S\ a_S$ | $c_2\ c_3\ c_4\ c_5\ c_6\ c_7\ c_S\ c_S$ |
| III | d | 0 | 1 1 0 0 | 1 1 0 0 | $a_3\ a_4\ a_5\ a_6\ a_7\ a_S\ a_S\ a_S$ | $c_3\ c_4\ c_5\ c_6\ c_7\ c_S\ c_S\ c_S$ |
| III | e | 0 | 0 0 1 0 | 0 0 1 0 | $a_4\ a_5\ a_6\ a_7\ a_S\ a_S\ a_S\ a_S$ | $c_4\ c_5\ c_6\ c_7\ c_S\ c_S\ c_S\ c_S$ |
| III | f | 0 | 1 0 1 0 | 1 0 1 0 | $a_5\ a_6\ a_7\ a_S\ a_S\ a_S\ a_S\ a_S$ | $c_5\ c_6\ c_7\ c_S\ c_S\ c_S\ c_S\ c_S$ |
| III | g | 0 | 0 1 1 0 | 0 1 1 0 | $a_6\ a_7\ a_S\ a_S\ a_S\ a_S\ a_S\ a_S$ | $c_6\ c_7\ c_S\ c_S\ c_S\ c_S\ c_S\ c_S$ |
| III | h | 0 | 1 1 1 0 | 1 1 1 0 | $a_7\ a_S\ a_S\ a_S\ a_S\ a_S\ a_S\ a_S$ | $c_7\ c_S\ c_S\ c_S\ c_S\ c_S\ c_S\ c_S$ |
| III | i | 0 | 0 0 0 1 | 0 0 0 1 | $a_S\ a_S\ a_S\ a_S\ a_S\ a_S\ a_S\ a_S$ | $c_S\ c_S\ c_S\ c_S\ c_S\ c_S\ c_S\ c_S$ |
| IV | a | 1 | 0 0 0 0 | 0 0 0 0 | $a_0\ a_1\ a_2\ a_3\ a_4\ a_5\ a_6\ a_7$ | $c_0\ c_1\ c_2\ c_3\ c_4\ c_5\ c_6\ c_7$ |
| IV | b | 1 | 1 0 0 0 | 1 0 0 0 | $a_1\ a_2\ a_3\ a_4\ a_5\ a_6\ a_7\ a_S$ | $c_1\ c_2\ c_3\ c_4\ c_5\ c_6\ c_7\ a_0$ |
| IV | c | 1 | 0 1 0 0 | 0 1 0 0 | $a_2\ a_3\ a_4\ a_5\ a_6\ a_7\ a_S\ a_S$ | $c_2\ c_3\ c_4\ c_5\ c_6\ c_7\ a_0\ a_1$ |
| IV | d | 1 | 1 1 0 0 | 1 1 0 0 | $a_3\ a_4\ a_5\ a_6\ a_7\ a_S\ a_S\ a_S$ | $c_3\ c_4\ c_5\ c_6\ c_7\ a_0\ a_1\ a_2$ |
| IV | e | 1 | 0 0 1 0 | 0 0 1 0 | $a_4\ a_5\ a_6\ a_7\ a_S\ a_S\ a_S\ a_S$ | $c_4\ c_5\ c_6\ c_7\ a_0\ a_1\ a_2\ a_3$ |
| IV | f | 1 | 1 0 1 0 | 1 0 1 0 | $a_5\ a_6\ a_7\ a_S\ a_S\ a_S\ a_S\ a_S$ | $c_5\ c_6\ c_7\ a_0\ a_1\ a_2\ a_3\ a_4$ |
| IV | g | 1 | 0 1 1 0 | 0 1 1 0 | $a_6\ a_7\ a_S\ a_S\ a_S\ a_S\ a_S\ a_S$ | $c_6\ c_7\ a_0\ a_1\ a_2\ a_3\ a_4\ a_5$ |
| IV | h | 1 | 1 1 1 0 | 1 1 1 0 | $a_7\ a_S\ a_S\ a_S\ a_S\ a_S\ a_S\ a_S$ | $c_7\ a_0\ a_1\ a_2\ a_3\ a_4\ a_5\ a_6$ |
| IV | i | 1 | 0 0 0 1 | 0 0 0 1 | $a_S\ a_S\ a_S\ a_S\ a_S\ a_S\ a_S\ a_S$ | $a_0\ a_1\ a_2\ a_3\ a_4\ a_5\ a_6\ a_7$ |

*Fig. 3.*

DIGITAL DUAL HALF WORD OR SINGLE WORD POSITION SCALER

The U.S. Government has rights in this invention pursuant to contract N00024-77-C-5112 awarded by the Department of the Navy.

This invention relates generally to scaler circuits for scaling digitized words and more particularly, to an improved scaler circuit offering simplification and the capability of expandibility over prior scaler circuits.

Scaler circuits are employed in digital systems to multiply or divide digital words by factors of powers of 2. Shift registers are commonly employed to perform such a function. For example, if a binary word is shifted towards the least significant digit by one bit in the shift register, the effect is to divide the binary word by 2. If the binary word is shifted another bit position towards the least significant bit, the result is to divide the original binary word by $2^2$ or 4. On the other hand, shifting the binary word towards its most significant bit position results in multiplication of the word by a power of 2.

However, the use of a shift register to effect the scaling operation has the inherent disadvantage of requiring one machine cycle or clock pulse for each bit position the word is shifted. Thus, if it is desired to divide a binary word by 16, which is equal to $2^4$, it would be necessary to shift the word 4 times, requiring four distinct and separate clock pulses.

To shorten the required shifting time scaler circuits have been devised wherein the digital word to be scaled is supplied through an arrangement of switches in parallel to a plurality of output terminals with the arrangement of switches being preset during a single clock pulse to shift the parallel word passing therethrough the desired number of bit positions. More specifically, such prior art scaling means comprises a plurality of groups of switches, the first group of which receives, in parallel manner, the N bit digital word to be shifted, and the last group of switches which functions to supply, in parallel manner, the shifted digital word to a plurality of output terminals.

Each of the group of switches is designed to supply the word presented thereto to a subsequent or successive group of switches which, in turn, functions to shift the received word a selected number of bit positions and then supply the shifted word to the next successive group of switches, and so on. Each of the groups of switches is constructed to shift the word presented thereto 2n bit positions where n is equal to 0 or an integer extending from 1 to $(x-1)$, where $2x=N$.

Thus, if the received input word is 8 bits (N=8) in length, the four groups of switches are constructed to shift the received data word presented thereto $2^0$, $2^1$, $2^2$, or $2^3$. Thus, the group of switches which shifts the word presented thereto by $2^x$ will effectively shift the word completely out of the system, whereas the group of switches which shifts the word presented thereto by $2^2$, for example, will shift the received word by 4 bits, thus shifting the four least significant bits out of the system since the system has only 8 output terminals.

If none of the groups of switches are enabled, the digital word supplied to the 8 input leads will be supplied directly to the 8 output leads of the system. In certain applications, the loss of some of the lower order bits of the word being scaled is acceptable. In other applications such loss is not acceptable and means must be provided to retain the shifted lower order bits. The retention of such lower order bits has been accomplished in prior art devices by what, in essence, amounts to including a second, dedicated scalar means in the system which in effect, permits entry of the shifted lower order bit positions of the scaled input word into the second dedicated scaling means. Such prior art extensions of the scaling function are quite limited with respect to the expandability of the amount of possible scaling.

On the other hand, many digital systems require more than one scaling means for the scaling of more than one word and also require extended scaling capability. Under such conditions, it would be advantageous to provide logic which will combine two otherwise separate scaling systems together to form a single scaling system with extended capability. The present invention provides such a structure.

In accordance with a preferred form of the invention, there is provided first and second scaling means, each comprising N input terminals for receiving an N bit word and N output terminals where $N=2^x$, and $(x+1)$ groups of first switching means with each group of switching means having input means and output means and being arranged in successive manner with the output means of each of the first $(x-1)$ groups of first switching means being connected in parallel manner to the input means of the next successive group of first switching means, and with the N bit digital input word being supplied in parallel to the N input means of the first group of first switching means.

Each group of said first switching means of said first scaling means corresponds to a group of first switching means of said second scaling means with each pair of corresponding groups of first switching means responsive to an enabling signal to selectively shift the N-bit digital words presented thereto by a selected one of $2^n=2^0$, $2^1$,-$2^x$ bit positions.

There is further provided $(x+1)$ groups of second switching means individually responsive, when enabled, to corresponding ones of the $(x+1)$ groups of the first switching means, when enabled, of said first and second scaling means to connect the $2^n$ least significant bit positions of the N-bit digital input word supplied to said first group of switching means of said first scaling means to the $2^n$ most significant bit positions of the corresponding group of switching means of the second scaling means, and means for selectively enabling corresponding groups of first switching means of said first and second scaling means and for enabling the corresponding ones of said second switching means.

In the drawings:

FIG. 3 is a truth table showing the relationship of the input signal and output signal of the structure of FIG. 3;

Figure 1:
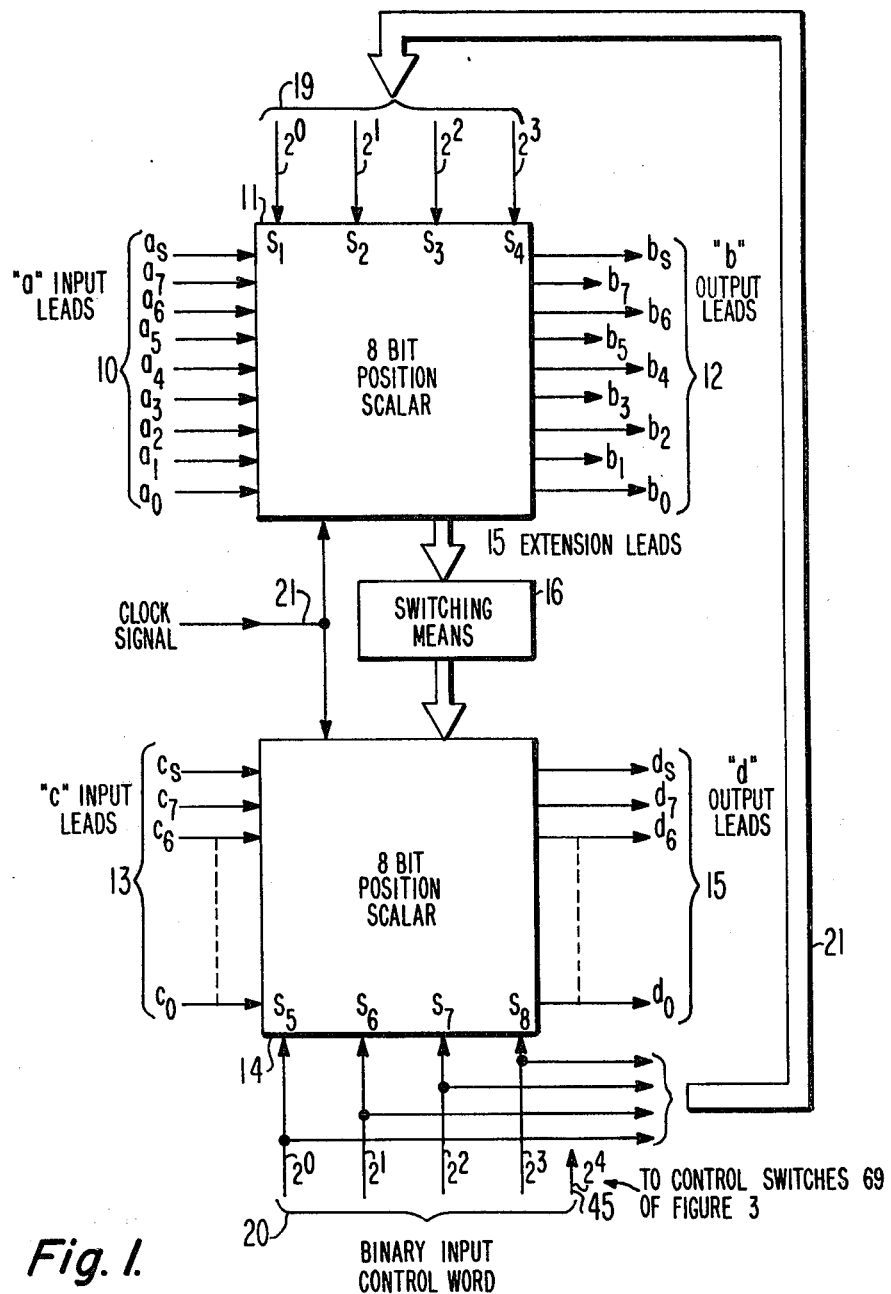
FIG. 1 is a general block diagram of a basic form of the invention.

Referring now to FIG. 1, an 8-bit position scaler 11 and its input and output leads 10 and 12 form a structure which is well-known in the art. It is the combination of the 8 bit position scaler 11 with the second 8 bit position scaler 14 and the interconnecting switching means 16 therebetween which form the essence of the present invention.

Considering the scaler 11 by itself, the operation thereof is essentially as follows. An 8 bit input lead is supplied to the input terminals $a_0$–$a_7$, with the bit supplied to input terminal $a_0$ representing the least significant bit of the input word. A polarity sign bit is supplied to the input terminal $a_s$. In the absence of any shifting within the scaler 11, the received input word on leads 10 will appear on output leads 12 with the input signal applied to terminals $a_0$–$a_7$ appearing on the output terminals $b_0$–$b_7$, respectively, and with the sign bit supplied to input terminal $a_s$ appearing on the output terminal $b_s$.

The scaler 11 contains a plurality of groups of switching means (shown in FIG. 2) each of which, when enabled, will shift the input signal supplied to input terminals $a_0$–$a_7$ a selected number of bit positions, ranging from $2^0$ to $2^x$, where $x+1$ is the number of groups of switches, as will be discussed in detail later herein in connection with FIG. 3.

Thus, for example, if the proper groups of switches within scaler 11 are enabled to shift the input signal supplied to input leads 10 three bit positions, the bits supplied to the input terminals $a_7$–$a_3$ will appear on the output terminals $b_4$–$b_0$. The bits supplied to the input terminals $a_2$–$a_0$ will be lost (in the absence of the second scaler means 14).

The second scaler means 14 can function independently in the same manner as does the scaler means 11. Specifically, an input signal on terminals $c_5$–$c_0$ supplied to input leads 13 of scalar 14 will appear on output terminals 15 thereof with the shifting of said input signal being determined by those particular groups of switches within the scaler 14 which are enabled by the control lead supplied to the control terminals 20. In the absence of the enabling of switching means 16 the two scaler means 11 and 14 can each function completely independently of each other except for the common clock signal supplied on the lead 21. However, even the clock signals supplied to the two scalers 11 and 14 can be independent of each other except for the required compatibility with the common overall system in which the two scalers might be employed. However, when switching means 16 is enabled, the scalers 14 and 11 are combined so that overflow from scaler 11 is entered into scaler 14.

In the foregoing example, where the 8 bit input word supplied to input lead 10 is shifted 3 bits in scaler 11, the shifted three least significant bits of said word will appear on the output terminals $d_5, d_6$, and $d_7$ of scaler 14 with the least significant bit appearing at output terminal $d_5$. The five most significant bits at terminals $a_7$–$a_3$ of the input data word will appear at the output terminals $b_0$–$b_4$ of scaler 11.

The sign bit supplied to the input terminals $a_s$ will appear on the output terminals $b_5$–$b_7$ and also $b_s$. The sign bit input terminals and output terminals $c_s$ and $d_s$ of scaler 14 will not ordinarily be active in the system when the scalers 11 and 14 are combined. Thus, in the example, the shifted word will appear on output terminals $d_5$–$d_7$ of scaler 14 and $b_0$–$b_4$ of scaler 11, with $a_s$ appearing on output terminals $b_5$–$b_7$ and $b_s$.

When operating in combination, the scalers 11 and 14 both receive the same control words on their control word input terminals 19 and 20. In the specific structure shown in FIG. 1, such control word is a 4-bit binary word with the least significant bit being supplied to the switching control inputs $S_1$ and $S_5$ of the scalers 11 and 14, respectively, and the most significant bit being supplied to switching control inputs $S_4$ and $S_8$, respectively. When the scalers 11 and 14 are operating independently, the control word supplied to the control word terminals 19 and 20 are supplied thereto independently and are not necessarily the same control word. In fact, such control words usually would be different.

Figure 2:
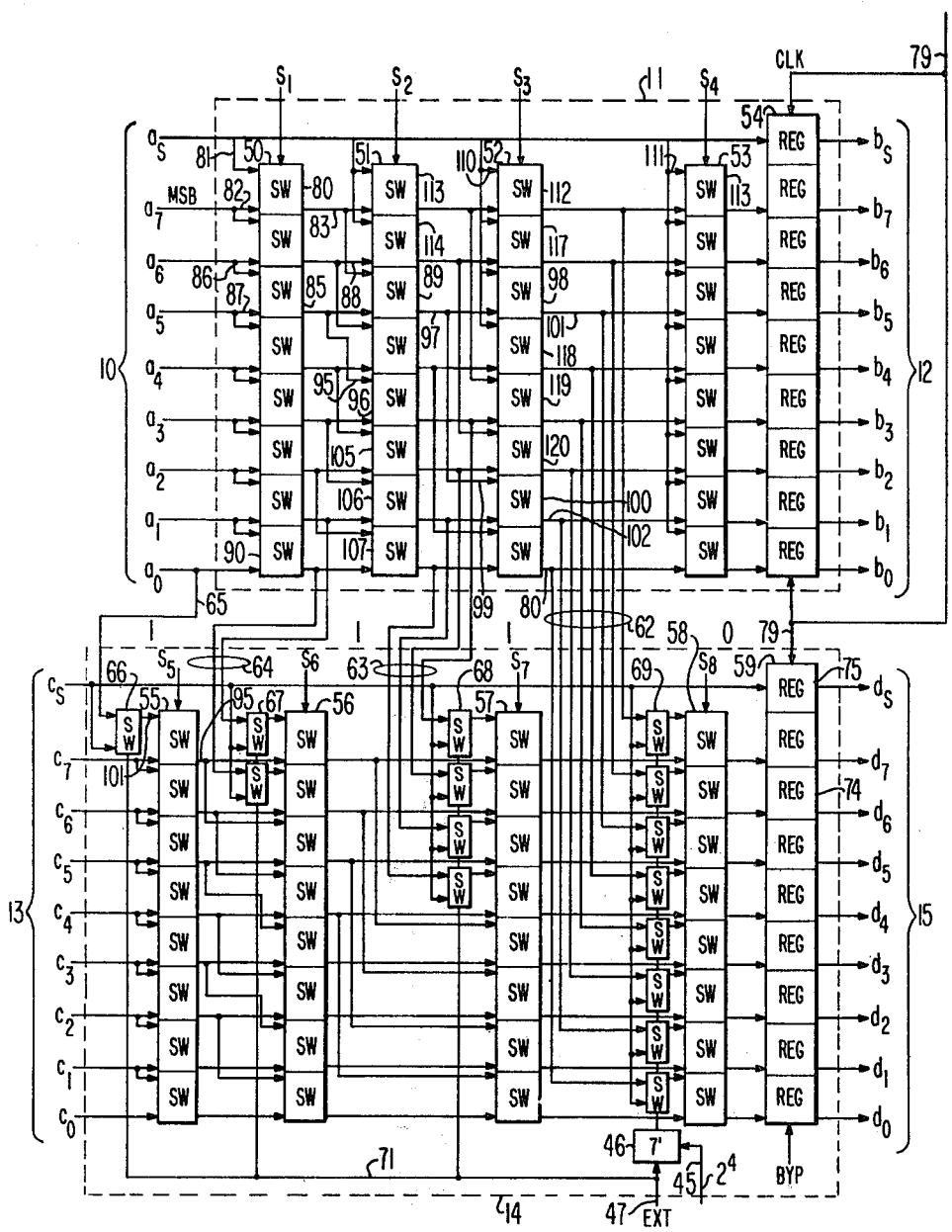
FIG. 2 is a more detailed block diagram of the structure of FIG. 1.

Referring to FIG. 2, there is shown in more detail a diagram of FIG. 1. Specifically, in FIG. 2 the structure within the dashed block 11 corresponds to the scaler 11 of FIG. 1 and the structure within the dashed block 14 corresponds to the structure within the block 14 of FIG. 1, and also the switching means 16. In particular, the switching means 16 of FIG. 1 is the equivalent of the switching means in the vertical columns of switching means 66, 67, 68, and 69 of FIG. 2.

Further, in FIG. 2 there are shown other groups of switches arranged in vertical columns. For example, there are eight individual switches arranged in the vertical columns of switches 50, as there are in the vertical columns 52, and 53. The eight switches in vertical column 50 receive the 8 bit input word in parallel from the eight input terminals $a_7$–$a_0$ and also the polarity indicating bit from the terminal $a_s$.

In the text herein, the various groups of switches arranged in vertical columns in the drawings and identified by reference characters 50, 51, 52, and 53 within the dashed block 11, and by the reference characters 55, 56, 57, and 58 within the dashed block 14 will be identified as switches or groups of switches 50, 51, 52, etc. The groups of switches arranged in vertical columns and designated by reference characters 66, 67, 68, and 69, which are the equivalent of the switches 16 of FIG. 1, will also be identified as groups of switches 66, 67, 68, and 69. It is also to be understood that the switches 66, 67, 68, and 69, although shown within the dashed line 14, can actually lie outside the dashed block 14 as represented by the switching means 16 of FIG. 1.

The switches 50, 51, 52, and 53, respectively, function when enabled by a binary 1 supplied to the control leads $S_1$–$S_4$, to shift the data input word supplied to input terminals 10 by various powers of 2, specifically $2^0$, $2^1$, $2^2$, and $2^3$ in response to enablement of groups of switches 50–53, respectively. Each of the individual switches of the groups of switches 50 through 53, such as individual switch 80, has two input terminals 81 and 82, and a single output terminal 83. In all of the groups of switches in FIG. 2, each individual switch is constructed so that when a binary "0" is supplied to the control lead thereto, such as control lead $S_1$. The switch will respond to the signal supplied to the lower input lead thereof, which in the case of switch 80 is input lead 82. Thus, when a 0 is supplied to control input $S_1$, the most significant bit appearing on input lead $a_7$ is supplied through switch 80 to its output terminal 83. There is no shifting of the signal supplied to input lead $a_7$. In a similar manner, all of the remaining individual switches of the group of switches 50 receive the signal appearing on its lower input terminal. As another example, individual switch 85, which is also under control of the control signal supplied to the control input $S_1$, receives the signal on its lower input terminal 87 when the control signal $S_1$ is a 0. On the other hand, switch 85 will respond to the input signal on its upper input terminal 86 when the control input on $S_1$ is a binary "1."

Thus, in summary, when $S_1$ receives a binary "0" the individual switch 85, as well as all of the other individual switches in the group of switches 50, will function to pass the 8 bit input word supplied thereto to the output without shifting said signal. The sign bit appearing presented or supplied to the input terminal $a_s$ remains on the terminal $a_s$ and is not shifted by switch 80 since switch 80 only responds to the input signal supplied to its lower input terminal 82.

On the other hand, if $S_1$ receives a binary "1" then each of the individual switches, such as individual switches 80 and 85, of the group of switches 50 will respond to the signal supplied to the upper input terminal thereof. Accordingly, switch 80 will respond to the sign signal on input terminal $a_s$ supplied to its upper input terminal 81 and will output such sign signal on its output terminal 83. The individual switch 85 will respond to the input signal supplied to its upper input terminal 86 to output such signal on its output terminal lead 88, which is coupled to the lower input terminal to switch 89 in the next successive group of switches 51. Thus, the bit supplied to input terminal $a_6$ has been shifted one bit position. In a similar manner, all the remaining individual switches of the group of switches 50 will function to shift a bit of the input signal presented thereto by one bit position.

Thus, the input signal supplied to input lead $a_0$ will not pass through the individual switch 90, but will still be supplied through lead 65 to the upper input terminal of switch 66.

As will be discussed later, the switch 66 will, at this time, be enabled so that it will pass the signal supplied thereto from input terminal $a_0$ to its output terminal 95. The signal on the polarity sign lead $c_s$ will be isolated from switches 55 by switch 66, and will also be isolated from the remaining group of switches 56 through 58 since all of the four groups of switches 66 through 69 are enabled by an extension signal supplied to lead 47 when the two scalers 11 and 14 are functioning as one system.

It can thus be seen that the enablement of the group of switches 50 functions to shift the 8 bit signal supplied thereto one bit position so that the bit supplied to each of the input terminals $a_0$ through $a_7$ and $a_s$ is supplied to the input terminal of the adjacent switch of switching group 51.

Considering now the group of switches 51, the shift of the signal supplied thereto from the group of switches 50 is two bit positions. Consider specifically, for example, the signal supplied to the individual switch 89 in group 51 from the individual switch 85 of group 50. Such input signal is also supplied to the input terminal 95 of individual switch 96. Thus, if the group of switches 51 has a binary "0" supplied to control input $S_2$ thereof, the switch 89 will respond to the output from individual switch 85 to produce on the output of switch 89 the input signal received from switch 85. On the other hand, if the control signal $S_2$ has a binary "1" supplied thereto, the switch 96 will respond to the output from switch 85 supplied to the upper input terminal 95 of individual switch 96, which is two bit positions removed from the output terminal of switch 86. Thus, the output from switch 85 is, in fact, shifted two bit positions as it is supplied to the group of switches 51.

In a similar manner, all of the other outputs from the individual switches of the group of switches 50 are shifted two bit positions in the group of switches 51 when a binary "1" is supplied to the control input terminal $S_2$ thereof.

Also in a similar manner, the group of switches 52 will shift the 8 bit signal supplied thereto four bit positions when the control input $S_3$ has a binary 1 supply thereto. The foregoing will be more evident from the following example. The output of switch 89 of group 51 is supplied to the lower input terminal of individual switch 98 of the group of switches 52 and is also supplied to the upper input 99 of the individual switch 100 of the group of switches 52. Thus, if the input to control terminal $S_3$ is a 0, switch 98 will respond to the output of switch 89 to produce on its output terminal 101 the signal received from switch 89. On the other hand, if the control signal on control terminal $S_3$ is a binary 1 then switch 100 will respond to the output of switch 89 to produce on output terminal 102 of switch 100 the signal received from switch 89.

Thus, when the group of switches 51 is enabled by a binary "1" being supplied to input control $S_2$, the outputs of the individual switches 96, 105, 106, and 107 of the group of switches 51 will be connected via the four leads 63 to the upper input terminals of the four individual switches of the group of switches 68. Since the group of switches 68 are enabled, the signals supplied from the output terminals of switches 96, 105, 106, and 107 will be supplied through the switches 68 to the four most significant bit (MSB) representing switches of the group of switches 57.

By definition of the operation of the circuit, both the group of switches 57 and the group of switches 52 will be enabled when the two scalers 11 and 14 are acting as one system. Thus, the switches 57 will all respond to the signal supplied to the upper input terminal thereof which, as can be seen from FIG. 2, is the output of the four switches 68.

In a similar manner, when the groups of switches 53 and 58 are enabled by binary 1's being supplied to the input control terminals $S_4$ and $S_8$ thereof, respectively, the outputs from the individual switches of the group of switches 52 are supplied via leads 62 to the input terminals of the eight enabled switches of the group of switches 69 and are conducted therethrough to the upper input terminals of the group of switches 58. The said group of switches 58 are, as mentioned above, enabled when the group of switches 53 are enabled so that they respond to the output from the individual switches of the group of switches 69. The output signals from switches 58 are supplied to the group of registers 59.

Consider now the effect of the shifting upon the polarity sign indicating input terminals as s and $C_s$. Consider first the polarity indicating lead $a_s$. If the group of switches 50 are enabled, the polarity indicating signal on lead $a_s$ will pass through switch 80 to output terminal 83. If the group of switches 51 are also enabled, the polarity sign signal will pass through switches 113 and 114 of the group of switches 51 directly from lead $a_s$, and will also pass through switch 89 from the output of switch 80. In a similar manner, if the group of switches 52 are also enabled, the polarity sign will pass through switches 112, 117, 98, and 118 of the group of switches 52 directly from the $a_s$ input lead and also through switches 119, 120, and 100 of the group of switches 52 from the outputs of switches 113, 114, and 89 of the group of switches 51.

When only the group of switches 53 are enabled, the polarity sign will be supplied through all of the switches of group 53 directly from the $a_s$ lead. The foregoing is consistent with the fact that when the group of switches 53 is enabled, the input signal appearing on terminals $a_0$ and $a_7$ are shifted eight bit positions and, therefore, are shifted completely out of the scaler 11 and are replaced with the sign signal appearing on the input lead $a_s$.

When operating as an independent scaler, the polarity sign bit appearing on input lead $c_s$ functions in the same manner as discussed above in connection with scaler 11. However, when scaler 14 is acting in combination with scaler 11, the sign bit signal appearing on input lead $c_s$ is eliminated from the circuit. Such elimination is effected by the fact that all of the groups of switches 66–69 are enabled so that the signal appearing on the sign bit input lead C is not supplied through the switches 66 through 69 to any of the groups of switches 55 through 58. The sign bit appearing on input lead $C_s$ is supplied only to the top register 75 of the group of registers 59. The output $d_s$ of register 75 is ignored when the shifted signal is read from the outputs $d_0$–$d_7$ and $b_0$–$b_7$.

The control word supplied to the four control inputs, $S_1$–$S_4$ of scaler 11 and the four control inputs $S_5$–$S_8$ of scaler 14 are the same control words when the two scalers 11–14 are acting in combination. Consider a specific control word as an example. Assume that the binary control word "0110" is supplied to the four control inputs $S_1$–$S_4$ and also $S_5$–$S_8$. The least significant bit of the binary word appears at the left hand end thereof and is supplied to the input control lead $S_1$. In accordance with the above discussion, the group of switches 50 produce no shift of the signal presented thereto since the control bit supplied to the control lead $S_1$ is a binary 0. However, both groups of switches 51 and 52 produce shifts of the signal presented thereto since a binary 1 is supplied to the two control inputs $S_2$ and $S_3$ of scaler 11 and also $S_6$ and $S_7$ of scaler 14. The group of switches 51 will shift the input word presented thereto by two bit positions and the group of switches 52 will shift the input word presented thereto from the group of switches 51 by four bit positions so that the total shift of the word as it appears at the output of the groups of switches 52 is six bit positions. Since the group of switches 53 and 58 have a 0 supplied to the control inputs $S_4$ and $S_8$ thereof, there will be no shifting of the word presented thereto from the group of switches 52 and 57.

Thus the word supplied from the switches 53 and 58 to the registers 54 and 74 is shifted a total of six bits and will appear at the output of the registers $d_2$–$d_7$ and $b_0$–$b_1$, with the sign bit appearing on the leads $b_2$–$b_7$ and also $b_s$.

The largest binary word which can be supplied to the four control inputs $S_1$–$S_4$ and $S_5$–$S_8$ without losing a portion of the input word 10 is a binary 0001, since a binary "1" supplied to the group of switches 53 and 58 will effect a shift of the word presented thereto by eight bit positions, which will, in fact, shift the word completely out of scaler 11 (except for the sign bits) and into the scaler 14. The shifted word will then appear at the output leads $d_0$–$d_7$ of the system. If the binary word 1111 is supplied to the control input terminals $S_1$–$S_4$ and $S_5$–$S_8$, the word supplied to the input terminals $a_0$–$a_7$ will be shifted a total of fifteen bit positions so that the bit supplied to input terminal $a_7$ will appear at output terminal $d_0$ and the remaining seven bits of the word originally supplied to input leads 10 will be shifted completely out of the lower scaler 14 and will be lost to the system.

Thus, in summary, by increasing the binary control word to a value 0001 or greater, the input word can be shifted completely into the lower scalar 14 and, in fact, can even be completely shifted out of scalar 14 in the following manner. Assume that the binary word is increased to 1001. The input word will then be shifted one bit in the group of switches 50 but will not be shifted in either of the group of switches 51 or 52. Thus the word presented to the group of switches 53 is the input word shifted one bit position. Since the group of switches 58 in the lower scalar 14 is also enabled as well as the transfer switches 69, the 1 bit shifted word presented to the group of switches 53 will be shifted an additional 8 bit positions into scaler 14, so that, for example, the $a_7$ bit will appear on the $d_6$ output and the $a_0$ input bit will be shifted completely out of the lower scaler 14.

The system can be completely cleared of the input word, $a_0$–$a_7$, which, in effect, amounts to a 16 bit shift thereof, by disabling the group of transfer switches 69, thereby causing the $c_s$ polarity bit to be supplied through all of the switches of the group of switches 58 and the group of registers 59 to output leads $d_0$–$d_7$.

Disabling of the group of transfer switches 69 can be done by providing a fifth control bit lead 45 and a transmission gate 46. The transmission gate 46 is inhibited when the fifth control bit lead 45 has a binary 1 supplied thereto. Such binary 1 indicates that the value of the binary control word has exceeded 15 and is equal to at least 16, which represents a 16 bit shift. As mentioned above, the extension signal supplied to the system via input lead 47 is a binary 1 at all times when the two scalers 11 and 14 act as a single system, thereby causing the groups of transfer switches 66 to 69 to be enabled under such circumstances. When the scalar systems 11 and 14 are acting independently, the extension signal supplied to extension input lead 47 is a binary 0, thus, for all practical purposes eliminating the transfer switches 66–69 from the system.

Instead of supplying an 8 bit word to the input terminals $a_0$–$a_7$ and the sign bit to input $a_s$ of scaler 11, it is possible to supply a 16 bit word to the system with the 8 least significant bits being supplied to the input leads $c_0$–$c_7$, the eight most significant bits being supplied to the input terminals $a_0$–$a_7$, and the sign bit being supplied to the sign bit input $a_s$. The lead $c_s$ would not be utilized. The 16 bit word can then be shifted in exactly the same manner as discussed above by supplying the same binary words to the control inputs $S_1$–$S_4$ and $S_5$–$S_8$. The shifting of the eight least significant bits supplied to the input terminals $c_0$–$c_7$ will then be under the control of the control word supplied to the control input terminals $S_5$–$S_8$. As shifting occurs, the major difference will be that the 16-bit word is being shifted rather than an 8 bit word as discussed above. Thus, any shifting of the 16-bit word will result in a loss of some of the least significant bits of the 16-bit input word. However, by adding additional scalers to the system in a manner described later herein in connection with FIGS. 4, 5, or 6, the 16-bit word can be shifted without loss of any of the bits. In fact, by use of the architecture shown in FIGS. 4, 5, or 6 a 24 bit or even a 32-bit word can be shifted without loss of bits. The system is expandable in that additional scalers can be added in accordance with either the structure of FIGS. 4, 5, or 6 to provide for additional shifting of an 8 bit word or to provide for the shifting, for example, of a 16, 24, or 32 bit word.

Referring now to FIG. 3, there is shown a truth table of the connections of the inputs of $a_0$-$a_s$ and $c_0$-$c_s$ to the output terminals $b_0$-$b_s$ and $d_0$-$d_6$, with various control words being supplied to the control inputs $S_1$-$S_4$ and $S_5$-$S_8$.

In FIG. 3 the table is divided into five vertical columns, A, B, C, D, and E, and into four horizontal sections I, II, III, and IV. The groups of binary 0's and 1's in column A represent the condition of the switches 66-69 of FIG. 2. More specifically, binary 0's in the portion III of column A indicate that the switches 66-69 are disabled so that scaler 11 and 14 operate independently of each other. Binary 1's in the lower half IV of column A indicate that switches 66 through 69 are enabled so that the two scalers 11 and 14 act in combination as a single logical unit.

The binary words in columns B and C represent the binary words supplied to the switches $S_1$-$S_4$ and $S_5$-$S_8$. In columns D and E there are shown specific connections of input leads $a_0$-$A_7$ and $c_0$-$c_7$ to the output terminals $b_0$-$b_7$ and $d_0$-$d_7$, with such various control words being supplied to the control inputs $S_1$-$S_4$ and $S_5$-$S_8$ as indicated in the columns D and E.

For purposes of convenience, the control words to the switches or control inputs $S_1$-$S_4$ and $S_5$-$S_8$ are assumed to be the same, both for independent operation of scalers 11 and 14 and for combined operation of scalers 11 and 14.

Consider, for example, the binary word 0000 supplied to both sets of control terminals $S_1$-$S_4$ and $S_5$-$S_8$ when the switches 66-69 are disabled, as shown in row III-a of FIG. 3. It can be seen in columns D and E that the inputs $a_0$-$a_7$ from portion III of the table are connected to the output terminals $b_0$-$b_7$ respectively. Similarly, the input terminals $c_0$-$c_7$ are connected to output terminals $d_0$-$d_7$, as shown in column E. The foregoing is true since the binary control word 0000 produces no bit shifting.

Consider now, however, the situation when the binary word 1100 is supplied to the control terminals $S_1$-$S_4$ and $S_8$-$S_5$ and when the switches 66-69 are disabled as shown in row III-d of FIG. 3. Under the foregoing conditions, the input terminals $a_3$-$a_7$ are connected, respectively, to the output terminals $b_0$-$b_4$ as shown in row III-d of column D. The sign bit $a_s$ is connected to the three output terminals $b_5$-$b_7$, also as shown in row III-d of column D. In row III-d of column E it can be seen that the input terminals $C_3$-$C_7$ are connected respectively to the output terminals $d_0$-$d_4$ and that the sign input terminal $C_S$ is connected to the output terminals $d_5$-$d_7$.

Since the two scalers 11 and 14 of FIG. 2 are operating independently of each other in portion III of the truth table of FIG. 3 the input terminals $a_0$-$a_s$ of scaler 11 never appear at the output terminals $d_0$-$d_7$ of scaler 14. The foregoing can be seen from column D of portion III-i of FIG. 3 wherein the signals supplied to input terminals $a_0$-$a_7$ are in fact shifted completely out of scaler 11 of FIG. 2 so that only the sign input on terminal $a_s$ remains connected to output terminals $b_0$-$b_7$. There are no circuit paths running from scaler 11 to scaler 14.

Figure 4:
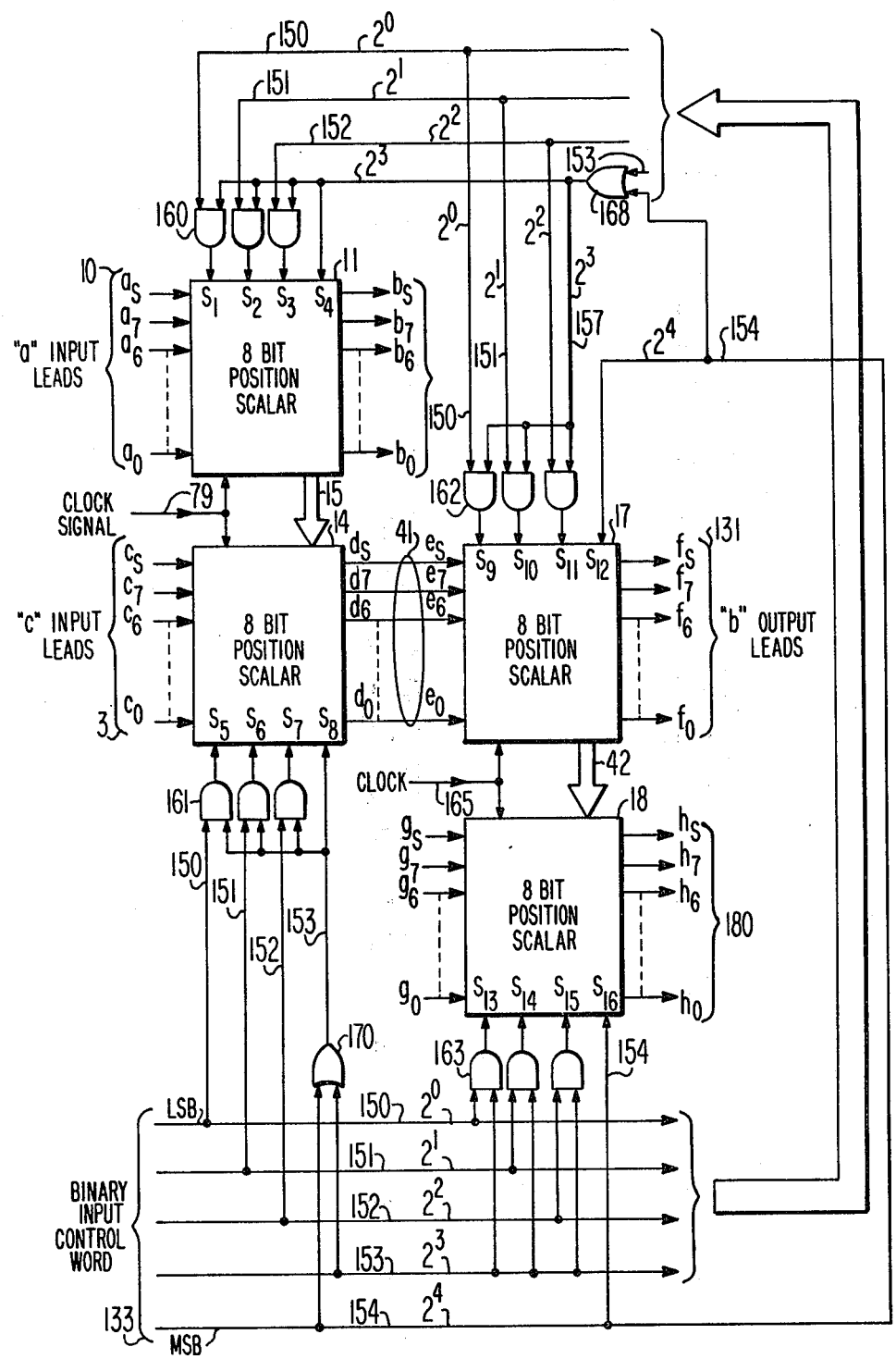
FIG. 4 is another block diagram of a basic form of the invention with additional scaler circuits for extending the shifting capability greater than that obtainable with the circuit of FIG. 2 with various degrees of shifting of the input signal thereto.

Referring now to the portion IV of FIG. 3, there is shown the connections from input terminals $a_0$-$a_7$ and $c_0$-$c_7$ to the output terminals $b_0$-$b_7$ and $d_0$-$d_7$ when scalars 11 and 14 are functioning as a combination, i.e. with the groups of switches 66-69 being enabled by virtue of a binary 1 being supplied to switching groups 66-69 as shown in the portion IV of column A of FIG. 4. When the binary control word consists of all 0's, (0000), as shown in row IV-a of column B, the input terminals $a_0$-$a_7$ are connected to output terminals $b_0$-$b_7$ as shown in row IV-a of column D, and the input terminals $c_0$-$c_7$ are connected to the output terminals $d_0$-$d_7$, as shown in row IV-a of column E. If, however, the binary word is greater than 0000 and, for example, has the value 1100 as shown in row IV-d, of column B, then the signals supplied to input terminals $a_0$-$a_s$ and also to input terminals $c_0$-$c_7$ are shifted, as shown in row IV-d of columns D and E.

More specifically, it can be seen that the binary value 1100 (equal to decimal 3) results in a shift of three bit positions of the bits supplied to input terminals $a_0$-$a_s$ and $c_3$-$c_7$. Thus the input terminals $a_3$-$a_7$ are connected respectively to output terminals $b_4$-$b_7$ and the sign terminal $a_s$ is connected to the three output terminals $b_5$-$b_7$, as shown in row IV-d of column D. The remaining input terminals $a_0$-$a_2$ are connected to output terminals $d_5$-$d_7$ as shown in row IV-d of column E and the input terminals $c_3$-$c_7$ are connected to the output terminals $d_0$-$d_4$, also as shown in row IV-d of column E. The input terminals $c_0$-$c_2$ are not connected to any input terminals and the bits supplied thereto are lost.

There are circumstances when it is desired to shift the 8 bit word at terminals $a_0$-$a_7$ sixteen bit positions without losing any of the bits of the input word. This can be accomplished in the manner shown in FIG. 4.

Considering FIG. 4 in the broad view, the two scalers 17 and 18 are identical to the two scalers 11 and 14 and, in combination, perform the same function as the scalers 11 and 14. The output terminals $d_014$ $d_s$ of scaler 14, which contain the 8 bit input word at terminals $a_0$-$a_7$ shifted 8 bit positions, are connected to the input terminals $e_0$-$e_7$ of scaler 17 so that scaler 17 corresponds to scaler 11 as it received the 8-bit input word $a_0$-$a_7$.

Scaler 18 corresponds to scaler 14 in that the word supplied to the input leads $e_0$-$e_s$ of scaler 17 can now be shifted 8 bit positions down into the 8 bit position scaler 18 which contains the transfer switches corresponding to the switches 66-69 of FIG. 2.

The structure of FIG. 4, however, requires a control means for supplying the binary control word to the four scalers 11, 14, 17, and 18, which is different from the means for supplying the control words to the structure of FIG. 2.

More specifically, once the 8 bit input word supplied to input terminals $a_0$-$a_7$ of scaler 11 has been shifted 8 bit positions to appear at the output terminals $d_0$-$d_7$ of scaler 14, scalers 11 and 14 must thereafter be disabled in the sense that any increase of the 4 bit binary word over the value 0001 will produce no further shifting of the word in the lower scaler 14. Such 4 bit control word is that portion of the control word supplied to input control leads 150-153, only. Any further shifting of the 8-bit input word appearing at the output terminals $d_0$-$d_s$ of scaler 14 must be done in the scaler system comprised of scalers 17 and 18.

The foregoing can be accomplished by means of the two groups of three AND gates 160 and 161. Specifically, when the 4 bit binary control word reaches a value of 0001, with the binary 1 at the left-hand side of the binary word representing the most significant bit position of the 4 bit control word, the three AND gates 160 will be disabled because such binary 1 is supplied to an inhibiting input of each of the three AND gates 160 through OR gate 168. A similar arrangement is shown in scaler 14 wherein the three AND gates 161 are inhibited through OR gate 170 when the binary control word reaches a value of 0001 or over. However, when the fourth bit position in the binary word 0001 becomes a 1 the three AND gates 162 re scaler 17 are enabled so that the values of the binary word exceeding 0001 are supplied to the control inputs $S_{11}$, $S_{10}$, and $S_9$ of scaler 17 and also to the inputs $S_{15}$, $S_{14}$, and $S_{13}$ of scaler 18.

Thus, when the 4 bit binary control word reaches a value of "1111," the 8 bit word supplied to the inputs $e_0$–$e_s$ of scaler 17 will have been shifted 7 bit positions into the scaler 18 in the same manner as discussed in connection with scalers 11 and 14. Thus input terminals $e_0$14 $e_6$ of scaler 17 will be connected to output terminals $h_1$–$h_7$ of scaler 18 and input terminal $a_7$ will be connected to output terminal $f_0$.

To shift the 8-bit word supplied to scaler 17 a full 8 bit positions and thereby shift it entirely out of scaler 17 and into scaler 18, there is provided a fifth input control lead 154, which represents the binary value $2^4$ equals to decimal 16. Thus, considering the binary control word now to be a 5 bit word, and the most significant bit position to be a binary "1," i.e., the binary control word is now 00001, the 8 bit input word supplied to the input terminals $e_0$–$e_7$ of scaler 17 will be shifted completely into the 8-bit scaler 18 and will appear on output terminals $h_0$–$h_7$ thereof.

Another set of AND gates 163, similar to AND gates 162, are connected to the control input terminals $S_{13}$–$S_{15}$ of scaler 18 and perform essentially the same function as the set of AND gates 162, namely, to enable groups of switches (not shown) in scaler 18 corresponding to groups of switches 55–57 of FIG. 2 in the scaler 14. The fifth control bit appearing on lead 154 is supplied to the input control $S_{16}$ to enable the group switches (not shown) in scaler 18 corresponding to the group of switches 58 of FIG. 2. The bus 42 between scalers 17 and 18 corresponds to bus 15 between scalers 11 and 14 of FIG. 1 and the clock input 165 corresponds to the clock input 21 supplied to scalers 11 and 14 of FIG. 1.

To enable the shifting of the 8 bit word presented to scalar 17 into the scaler 18, the fifth position lead 154 is supplied through OR gate 168 to the inhibit inputs of AND gates 160 and through OR gate 170 to the inhibit inputs of AND gates 161, thus freezing the status of the 8 bit position scalers 11 and 14 in that the input word at terminals $a_0$–$a_7$ appears at the output terminals $d_0$–$d_7$ of scaler 14, and will not be affected by further increases in the value of the binary bit control word above the value of 00001. If the value of such binary control word should increase to 10001 then a binary 1 will be supplied to the control input $S_9$ of scaler 17 and also to control input $S_{13}$ of scaler 18, thereby effecting a one bit shift of the word supplied to the input terminals $e_0$–$e_s$ of scaler 17 in the same manner as discussed above in connection with scalers 11 and 14 when the 8 bit word stored in scaler 14 is shifted by 1 bit.

If the 5-bit binary control word is increased to a value of 11111, then the 8-bit word appearing at the output terminals $h_0$–$h_7$ of scaler 18 will be shifted 7 bit positions so that only the most significant bit will remain in scaler 18 and will appear on output terminal $h_0$.

To completely clear scaler 18 of the 8-bit word supplied thereto, a sixth control bit lead (not shown) can be connected to a transmission gate (not shown) corresponding to lead 45 and transmission gate 46 of FIG. 2 so that the transfer switches of scaler 18, corresponding to the transfer switches 69 of FIG. 2, are disabled in the same manner as discussed in connection with the structure of FIG. 2.

Figure 5:
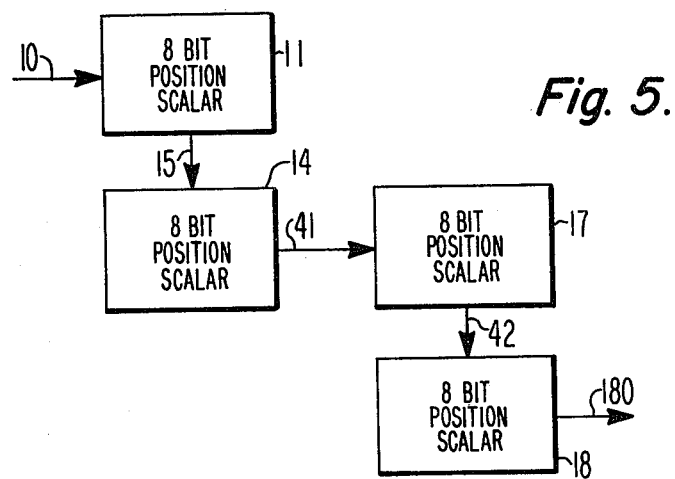
FIG. 5 is a broad block diagram of the structure of FIG. 4.

In FIG. 5, there is shown a simplified block diagram of the structure of FIG. 4. Specifically, FIG. 5, shows the path of the 8 bit input signal as it is shifted 8 bits in scalers 11 and 14 acting as a first unit, and subsequently in scalers 17 and 18 acting as a second unit. In FIG. 5, the input signal is supplied via bus 10 to the input of scaler 12 and then shifted via leads 15 to scaler 14 and then supplied via leads 41 to scaler 17. Subsequently, the 8 bit signal supplied to scaler 17 is shifted 8 bit positions via leads 42 to scaler 18 and appears at the output thereof. It is to be noted that the leads 10, 15, 41, 42, and 180 of FIG. 5 correspond to buses bearing similar reference characters in FIG. 4.

Figure 6:
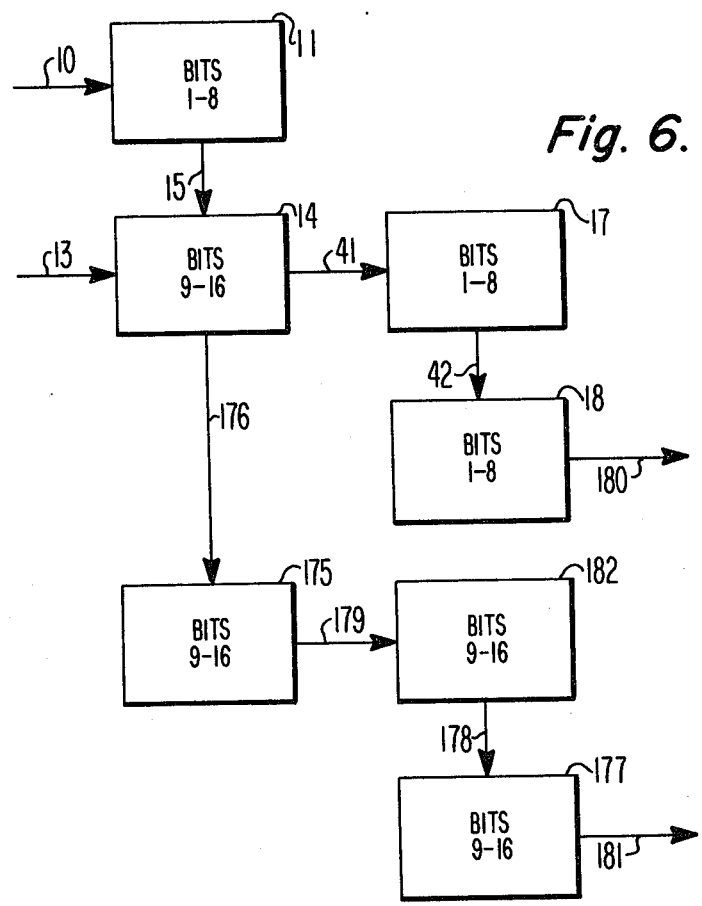
FIG. 6 is a broad block diagram illustrating how the system can be greatly expanded with the addition of more scaler circuits.

Referring now to FIG. 6, there is shown a functional diagram employing the same symbolism employed in FIG. 5 to illustrate an expansion of the structure to a 16-bit word as compared to the 8 bit word employed in the example of FIGS. 1-5.

In FIG. 6, the scalers 11, 14, 17, and 18 correspond to the scalers 11, 14, 17, and 18 of FIG. 4 with the input leads, the output leads, and the interconnecting busses 10, 15, 41, 42, and 180 corresponding to similarly identified leads and buses of FIG. 5. The portion of the circuit of FIG. 6 identified above operates in the same manner as the structure of FIG. 5.

However, in FIG. 6, there are provided additional scalers 175, 182, and 177 which operate in the same manner and substantially in parallel with that portion of FIG. 6 which corresponds to the structure of FIG. 5.

The second 8 bits of the 16-bit word are supplied to input leads 13 of scaler 14 with the first 8 bits of the 16 bit word being supplied to input leads 10 of scaler 11, as discussed above.

As the groups of switches within scalers 11, 14, and 175 are energized with the same binary control word, the second 8 bits (bits 9–16) are shifted into scaler 175 simultaneously with the shifting of the bits 1–8 supplied to scaler 11 into scaler 14.

Substantially simultaneously the bits 1–8 appearing at the output 41 of scaler 14 and bits 9–16 appearing at the output 179 of scaler 175 are supplied to the input terminals of scalers 17, and 182, respectively, whose control inputs are energized by the same binary control words, with additional fourth, fifth, and sixth bits as discussed in connection with FIG. 4, to shift the word supplied to the inputs thereof to scalers 18 and 177 via buses 42 and 178 respectively. Thus, the 16 bit words supplied to the input leads 10 and 13 of scalers 11 and 14 now appear at the outputs 180 and 181 of scalers 18 and 177, having been shifted a full 16-bit positions.

I claim:

1. An expandable scaler for scaling digital words comprising:

first N bit position scaler means having N input terminals $a_0$–$a_{n-1}$ for receiving a first N bit input word, and N output terminals $b_o$–$b_{N-1}$, and comprising:

(x+1) control signal sources for generating (X+1) control signals;

(x+1) first switching means $S_1$–$S_{(x+1)}$ each responsive to one of said control signals for shifting each bit of said N bit input word in any combination of $2^\circ$, $2^m$, $-2^x$ = m bit positions at said output terminals $b_0$–$b_{N-1}$ to cause the bit supplied to an input terminal $a_n$ of terminals $a_0$-$a_{N-1}$ to appear at output terminal $b_{n-m}$ of output terminals $b_0$-$b_{N-1}$, and where $\log_2 N = x$;

second N bit position scaler means having N input terminals $c_0$-$C_{N-1}$ for receiving a second N bit input word and N output terminals $d_0$-$d_{N-1}$ and comprising $(x+1)$ second switching means $S_{x+2}$-$S_{2(x+1)}$ each responsive to one of said control signals and corresponding in bit shifting capability respectively to said switches $S_1$-$S_{x+1}$ for shifting each bit of said second N bit input word any combination of $2°$, $2^1$-$2^x = k$ bit positions at the said output terminals $d_0$-$d_{N-1}$ to shift the bit supplied to input terminal $c_n$ of terminals $c_0$-$C_{N-1}$ to output terminal $d_{n-k}$ of output terminals $d_0$-$d_{N-1}$;

each of said switching means $S_1$,-$S_{x+1}$ and $S_{x+2}$-$S_{2(x+1)}$ comprising a plurality of individual switches each responsive to an energizing signal to shift a bit supplied thereto a selected one of $2°$, $2^1$,-$2^x$ bit positions respectively; and third switching means responsive to an enabling signal to transfer the input signals otherwise supplied to the R least significant bit input terminals of the individual switches of said first switching means to the R most significant bit input terminals of individual switches of the second switching means having the same bit shifting capability, where R equals the sum of the bit position shifts produced in response to the energization of corresponding switching means of said first and second switching means.

2. An expandable scaler for scaling an N bit digital input word and comprising:

first and second scaling means each comprising:
N input terminals for receiving an N bit word;
N output terminals; and
$(x+1)$ groups of first switching means with each group having input means and output means and being arranged in successive manner with the output means of each of the first x groups of said first switching means being connected in parallel manner to the input means of the next successive group of first switching means, and where $2^x = N$;

means for supplying the N bit digital input word to the input terminals of said first scaling means;

each group of first switching means of said first scaling means corresponding in bit shifting capability to a group of first switching means of said second scaling means with each of such corresponding groups of switching means responsive to an enabling signal to selectively shift the N bit digital input word by one of $2^n = 2°$, $2^1$,-$2^x$ bit positions; and $(x+1)$ groups of second switching means individually responsive, when enabled, to corresponding ones of the $(x+1)$ groups of first switching means, when enabled, of said first and second scaling means to connect the $2^n$ least significant bits of the N bit digital input word supplied to said group of first switching means of said first scaling means to the $2^n$ most significant bit positions of the corresponding group of first switching means of said second scaling means; and means for selectively enabling corresponding groups of first switching means of said first and second scaling means and for enabling said groups of second switching means.

3. An expandable scaler for scaling a received digital input word comprising:

first and second scaling means each comprising:
input means;
output means; and
$(x+1)$ corresponding groups of N two-state first switching means having the same bit shifting capacity with each two-state switching means representing a bit position of an N bit word and with the two-state switching means of the first corresponding groups of said $(x+1)$ corresponding groups of switching means, when in their first state receiving an N bit input word in an unshifted and parallel manner, and with each successive group of two-state switching means, when in their first state, receiving the N bit word supplied thereto from the immediately preceding group of N two-state switching means in an unshifted and parallel manner, and with each of said corresponding groups of switching means, when in their second state, shifting the supplied N bit word $2^n$ bit positions towards its least significant bit position, where n can be 0 or an integer from 1 to x and different for each corresponding groups of switching means; and $(x+1)$ groups of two-state second switching means each corresponding to one of the corresponding groups of switching means of said first and second scaling means and each responsive to its second state to connect the $2^n$ least significant bits of the N bit word supplied to a given group of switching means of said first scaling means to the $2^m$ most significant bit representing switching means of the group of switching means of said second scaling means corresponding to said given group;

said groups of second switching means responsive to their first states to electrically isolate said first scaling means from said second scaling means.

4. An expandable scaler as in claim 3 in which each switching means comprises:

first and second input means and an output means with the N bit input word being supplied to the first input means of the switching means of said first group of switching means of said first scaling means;

means for connecting the first input means of each switching means of each successive group of switching means of said first scaling means to the output means of that switching means of the immediately preceding group of switching means representing the same bit order; and means including said groups of second switching means for connecting the input means of each switching means to the output means of that switching means of the immediately preceding group of switching means of said first and second scaling means which is removed from said same bit order by the bit shift effected by said successive group of switching means.

5. An expandable scaler as in claim 3 and further comprising:

means for generating a first control signal;
means for generating a plurality of second control signals;
third scaler means;
said third scaling means comprising $(x+1)$ groups of N two-state third switching means with a first group thereof being responsive to a first control signal to receive the unshifted N bit output word from the output means of said second scaling means in a parallel manner, and with each successive group of third switching means being responsive to said first control signal to receive the unshifted N bit word from the immediately preceding group of two-state third switching means, and with each of said groups of two-state third switching means being responsive to one of said second control signals to shift the received N bit word a number of bit positions $2^n$ towards its least significant bit, where n is 0 or an integer from 1 to N and is different for each group of switching means.

* * * * *

UNITED STATES PATENT AND TRADEMARK OFFICE
CERTIFICATE OF CORRECTION

PATENT NO. : 4,411,009

DATED : October 18, 1983

INVENTOR(S) : Lloyd W. Martinson

It is certified that error appears in the above-identified patent and that said Letters Patent is hereby corrected as shown below:

Col. 4, line 56, "$S_1$. The" should be --$S_1$, the--.

Col. 6, line 56, "as s and $C_s$." should be --as $a_s$ and $C_s$.--.

Col. 6, line 58, "are enabled." should be --are enabled,--.

Col. 10, line 35, "$d_0$ 14 $d_s$" should be --$d_0$-$d_s$--.

Col. 11, line 16, "$e_0$ 14 $e_6$" should be --$e_0$-$e_6$--.

Signed and Sealed this

Twenty-eighth Day of February 1984

[SEAL]

Attest:

GERALD J. MOSSINGHOFF

Attesting Officer

Commissioner of Patents and Trademarks